United States Patent
Singh et al.

(10) Patent No.: US 12,400,142 B2
(45) Date of Patent: Aug. 26, 2025

(54) DETERMINING REINFORCEMENT LEARNING MODEL REWARD SIGNAL TIMING

(71) Applicant: International Business Machines Corporation, Armonk, NY (US)

(72) Inventors: Sweta Singh, Bangalore (IN); Vaibhav Murlidhar Kulkarni, Bangalore (IN); Harshita Pandey, Tallital Nainital (IN); Devyanshi Singh, Lucknow (IN); Missula Meghana, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 17/238,314

(22) Filed: Apr. 23, 2021

(65) Prior Publication Data

US 2022/0343208 A1    Oct. 27, 2022

(51) Int. Cl.
*G06N 20/00* (2019.01)
(52) U.S. Cl.
CPC .................... *G06N 20/00* (2019.01)
(58) Field of Classification Search
CPC ..................................................... G06N 20/00
See application file for complete search history.

(56) References Cited

U.S. PATENT DOCUMENTS

| | | | |
|---|---|---|---|
| 11,429,762 B2 * | 8/2022 | Mallya Kasaragod | G06F 30/20 |
| 11,893,994 B1 * | 2/2024 | Tucker | G06F 40/42 |
| 2014/0180978 A1 * | 6/2014 | Martinez | H04L 63/302 706/12 |
| 2020/0218999 A1 | 7/2020 | Eleftheriadis | |
| 2020/0285995 A1 | 9/2020 | Khosla | |
| 2021/0174245 A1 * | 6/2021 | Lewis | G05B 13/0265 |
| 2022/0180125 A1 * | 6/2022 | Shen | G06V 10/454 |

FOREIGN PATENT DOCUMENTS

CN    111582311 A    8/2020

OTHER PUBLICATIONS

Pardo et al., "Time Limits in Reinforcement Learning," Proceedings of the 35th International Conference on Machine Learning, 2018, 10pgs (Year: 2018).*

(Continued)

*Primary Examiner* — Eric J. Bycer
(74) *Attorney, Agent, or Firm* — David K. Mattheis

(57) ABSTRACT

Dynamically determining timing for a machine learning model reward signal by receiving, by a first machine learning model, data associated with a first system state, and an action determined by a second machine learning model according to the first system state, determining, by the first machine learning model, a sleep time duration for the second machine learning model according to the first system state and the action, receiving, by the first machine learning model, after the sleep time duration, data associated with a second system state, determining, by the first machine learning model, a first reward signal according to the difference between the first system state and the second system state and the sleep time duration and updating the first machine learning model according to the first reward signal, the difference between the first system state and the second system state, and the sleep time duration.

20 Claims, 4 Drawing Sheets

(56) References Cited

OTHER PUBLICATIONS

Ashraf, Mohammad, "Reinforcement Learning Demystified: A Gentle Introduction", towards data science, Apr. 7, 2018, 5 pages, <https://towardsdatascience.com/reinforcement learning-demystified-36c39c11ec14>.

Authors et al.: Disclosed Anonymously, "Hierarchical Multi-Agent Systems for Multi-Objective/Multi-Metric Classification", An IP.com Prior Art Database Technical Disclosure, IP.com No. IPCOM000262616D, IP.com Electronic Publication Date: Jun. 16, 2020, 5 pages.

Deverett et al., "Interval timing in deep reinforcement learning agents", 33rd Conference on Neural Information Processing Systems (NeurIPS 2019), Vancouver, Canada, 10 pages.

Du et al., "Adapting Auxiliary Losses Using Gradient Similarity", arXiv:1812.02224v2 [stat.ML] Nov. 25, 2020, 21 pages.

Garchyl, "Applications of Reinforcement Learning in Real World", towards data science, Aug. 1, 2018, 19 pages, <https://towardsdatascience.com/applications-of-reinforcement-learning-in-real-world-1a94955bcd12>.

Han, Miyoung, "Reinforcement Learning Approaches in Dynamic Environments", Thesis, Databases [cs.DB]. Télécom ParisTech, 2018, 125 pages, <https://www.researchgate.net/publication/328260738_Reinforcement_Learning_Approaches_in_Dynamic_Environments>.

Tzorakoleftherakis, Emmanouil, "Three Things to Know About Reinforcement Learning", Analytics India Magazine, Nov. 18, 2019, 17 pages, <https://analyticsindiamag.com/three-things-to-know-about-reinforcement-learning/>.

Obert et al., "Optimizing Dynamic Timing Analysis with Reinforcement Learning", 2019, SAND2019-13625R, 6 pages.

Moens et al., "Learning and forgetting using reinforced Bayesian change detection", PLOS Computational Biology, Published: Apr. 17, 2019, 41 pages,<https://doi.org/10.1371/journal.pcbi.1006713>.

Mell et al., "The NIST Definition of Cloud Computing", National Institute of Standards and Technology, U.S. Department of Commerce, NIST Special Publication 800-145, Sep. 2011, 7 pages.

Raviv et al., "Maximizing Service Reward for Queues with Deadlines", arXiv:1805.11681v3 [cs.PF] Aug. 23, 2018, 13 pages.

Hu et al., "A Dynamic Adjusting Reward Function Method for Deep Reinforcement Learning with Adjustable Parameters", Mathematical Problems in Engineering, vol. 2019, Article ID 7619483, 10 pages, 2019, <https://www.hindawi.com/journals/mpe/2019/7619483/>.

Kim et al., "Reinforcement Learning Based Resource Management for Network Slicing", MDPI, Applied Sciences, Published: Jun. 9, 2019, 17 pages, <https://www.mdpi.com/2076-3417/9/11/2361>.

Krishnan et al., "Learning to Optimize Join Queries With Deep Reinforcement Learning", arXiv:1808.03196v2 [cs.DB] Jan. 10, 2019, 19 pages.

\* cited by examiner

DETERMINING REINFORCEMENT LEARNING MODEL REWARD SIGNAL TIMING

BACKGROUND

The disclosure relates generally to determining the timing of reinforcement learning model reward signals. The disclosure relates particularly to training a second model to dynamically determine the timing of a reward signal for a first model.

Workload management systems enable changes to system parameters and application configurations to improve system performance. Iterative loops following steps of measure system performance, alter system parameters and application configurations, and remeasure system performance may be used to with machine learning models, such as reinforcement learning models to improve system performance.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable dynamic determination of machine learning model reward signal timing.

Aspects of the invention disclose methods, systems and computer readable media associated with dynamically determining timing for a machine learning model reward signal by receiving, by a first machine learning model, data associated with a first system state, and an action determined by a second machine learning model according to the first system state, determining, by the first machine learning model, a sleep time duration for the second machine learning model according to the first system state and the action, receiving, by the first machine learning model, after the sleep time duration, data associated with a second system state, determining, by the first machine learning model, a first reward signal according to the difference between the first system state and the second system state, and the sleep time duration and updating the first machine learning model according to the first reward signal, the difference between the first system state and the second system state, and the sleep time duration.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
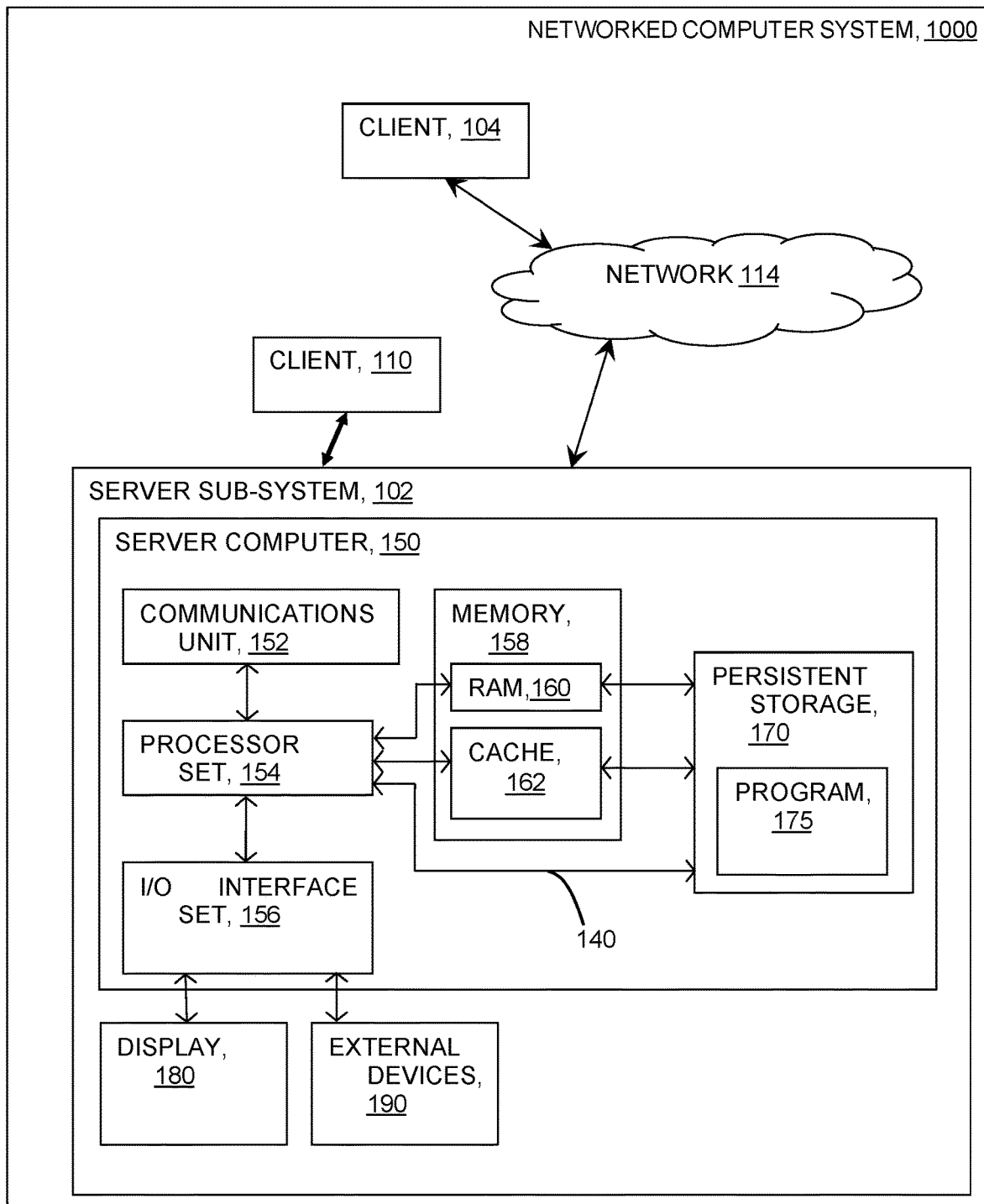
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Given their ability to deal with uncertainty, Reinforcement Learning (RL) models may be used to address the challenge of resource management, such as managing computing environment resources to improve application performance. For example, managing resources to improve a database application's performance by altering application job classifications and shifting resources to match job needs.

Resource management systems may use heuristic-based Workload Management Systems (WLM) that are static in nature and do not respond to the changing dynamics of the system. These systems are marked by large system state space and take a considerable amount of time in reflecting changes in the state after tuning a parameter. This time is uncertain and varies with the parameter tuned. Therefore, there is uncertainty in the time that systems need to wait before sending out the reward signal to the RL agent.

Some RL algorithms receive a reward signal either immediately after the execution of an action or after a fixed time. Disclosed embodiments enable a method for dynamic feeding of reward signals using an additional RL agent which learns the time that the main agent needs to wait before receiving a reward signal.

An RL Agent 1 refers to the agent primarily responsible for determining actions to adjust one or more of the WLM tunable parameters, in order to alter performance and stability in dynamically changing environments. The RL Agent 1, sleeps for a fixed amount of time after taking an action, and then records the observations. However, as mentioned above, a major shortcoming of the fixed sleep time is that the action might not have been able to impact the environment in that fixed time. Thus, fixed sleep duration intervals may lead to faulty observations being stored as experiences. The additional RL Agent, RL Agent 2, (RL_2), determines the appropriate time the RL Agent 1 should wait before taking an observation.

In an embodiment, one or more components of the system can employ hardware and/or software to solve problems that are highly technical in nature (e.g., dynamically determining timing for a machine learning model reward signal by receiving, by a first machine learning model, data associated with a first system state, and an action determined by a second machine learning model according to the first system state, determining, by the first machine learning model, a sleep time duration for the second machine learning model according to the first system state and the action, receiving, by the first machine learning model, after the sleep time duration, data associated with a second system state, determining, by the first machine learning model, a first reward signal according to the difference between the first system state and the second system state and the sleep time duration, updating the first machine learning model according to the first reward signal, the difference between the first system state and the second system state, and the sleep time duration, etc.). These solutions are not abstract and cannot be performed as a set of mental acts by a human due to the processing capabilities needed to facilitate dynamic reward signal timing determination, for example. Further, some of the processes performed may be performed by a specialized computer for carrying out defined tasks related to reward signal timing determination. For example, a specialized computer can be employed to carry out tasks related to dynamically determine reward signal timings, or the like.

Workload management systems may include the use of a machine learning model to adjust system parameters to improve system performance. Performance measures such as system throughput and queue wait times may be monitored as indicators of system performance. Adjustments to system parameters may be made to improve throughput and to reduce queue wait times. The machine learning model may include a reinforcement learning model, RL-1, as training and testing data sets may not be available for training a supervised learning model.

In an embodiment, the RL model utilizes a Markov Decision Process wherein an action is selected by the model according to a current state S, of the system. Implementation of the selected action alters the system state from S, to S'. After waiting for a defined amount of time, the RL model notes the change of system state and determines a reward signal R1 according to the changes in the system state. The model learns to maximize the reward signal R1 by selecting appropriate actions from any particular current system state. Defining a fixed wait time for all system states and associated actions increases the likelihood that the action determined by the model has not yet had an impact upon system performance—leading to false associations of the action and current consequences, and a model with network weights or a state action table which yield less than satisfactory system performance results.

In an embodiment, the method utilizes quality learning, or Q-learning in training the RL-1 model. In this embodiment, the method creates a matrix of [state, action] entries, to track the overall reward from actions taken in response to system states. The model may select an action based upon existing matrix values, exploiting the know effect of a particular action from a particular state. The model may explore a new action, acting randomly and creating a new matrix entry associated with the exploratory action from the current system state. Over time the trained model evolves, and the matrix grows. The model includes a setting to determine how often the model exploits the existing table entries and how often the model explores and creates new entries.

In an embodiment, the system complexity requires a different approach as the matrix size becomes unmanageable due to state and action data sizes and the number of possible system states and actions. In this embodiment, the RL-1 model includes two neural networks rather than the matrix. The first network predicts estimated Q values for a current state S, and the second network predicts target Q values associated with a new state S', associated with the effect of an action A. The network weights changes over time according to the effects actions have upon the system from different states in terms of the determined reward signals for the state-action pairings.

In this embodiment, the method represents the states S, S', of the system using point-in-time, operating system level metrics as well as application performance statistics, such as database application performance statistics. In this embodiment, the method normalizes all system performance statistics as a percentage of the total available resource utilization or consumption for each parameter. For example, memory usage expressed as a percentage of total memory available for use, etc. The method determines and stores the system state at regular timed intervals. RL-1 selects actions from a set of discrete choices associated with control levers for the system according to the options afforded by the WLM control application. Such levers update application configuration parameters. For example altering the service class properties of simple, medium, and complex data manipulation language (DML) lanes of an application, changing the scheduling policy for a DML lane e.g., shortest job first, first in first out, last in first out, etc., changing the parallelism of queries, and changing sort heap parameters. In an embodiment, the method associates different actions A, with different likelihoods of effecting the respective control levers offered by the WLM. In this embodiment, the method associates each action A, with particular control levers.

The RL-1 agent waits a defined amount of time and then determines the changes in monitored system aspects from previous state S, to now current state S'. RL-1 associates the changes from S-S', with the action A, taken. RL-1 determines a reward signal R1 for the S-A, pairing according to the S-S' changes. In an embodiment, the reward signal R1 reflects changes in system throughput and system queue wait times. In this embodiment, increases in throughput increase the reward signal R1, decreases in throughput decrease the reward signal R1. Increases in queue wait times decrease the reward signal R1 and decreases in queue wait times increase the reward signal R1. In an embodiment, the reward signal R1 reflects changes in system stability over time, where compromises to the system stability reduce the R1 reward signal.

In an embodiment, the method updates RL-1 according to the S-S' system state changes, the action A, taken or recommended in response to the state S, and the reward signal R1 determined according to the state change effected by the action. The updates to RL-1 yield a more precisely trained model for predicting the action to be implemented from any particular state S, to improve system performance.

In an embodiment, the method for dynamically determining the timing of a reward signal for a first machine learning model includes monitoring the activities of the monitored system and the performance monitoring machine learning model. In this embodiment, the method receives system state data and the RL-1 model action taken, or recommended, according to the system state data. For example, the method, and an associated second machine learning model, such as a second reinforcement learning model, RL-2, receives data indicating a system state S, and data indicating that the RL-1 model identified and implemented action A, to alter the system state and improve system performance. In an embodiment, the method also receives an indication of the system performance metrics expected to be affected by action A.

In an embodiment, RL-2 determines a sleep time interval or duration for RL-1 to wait before assessing system state S'. In an embodiment, RL-2 determines an exploitation—exploration parameter according to user defined thresholds. The method then exploits current network or table information to determine a sleep time duration for RL-1, or explores a new sleep time duration for the current input of S and A, according to the exploration/exploitation determination. RL-2 sleep time durations may be in defined durations, 1 minute, 2 minutes, etc. As an example, for a user defined threshold of 0.2, 20% of all sleep time duration determinations should be explorations while the remaining 80% should be exploitations. In an embodiment, the method generates a random number between zero and one and selects exploration for all random number values less than or equal to 0.2. The method then determines a sleep duration time for RL-1 as either an exploitation of previous sleep time durations associated with significant system changes, or explores a new sleep time duration, depending upon the value of the generated random number.

In an embodiment, RL-2 monitors the system state during the sleep duration. In this embodiment, RL-2 generates a reward signal and wakes RL-1 after the difference in systems states exceed a defined system state difference threshold. In this embodiment, the method records the sleep time duration associated with exceeding the threshold as a successful sleep time duration and an exploitation sleep time duration.

In an embodiment, after passage of the determined sleep time duration from RL-2, RL-1 awakens and records the then current system state, S'. RL-1 then determines the difference between S and S'. In an embodiment, the method expresses each of S and S' as a feature vector of the system state. RL-1 compares the two S and S' feature vectors determining the degree of change between the two vectors. RL-1 uses the degree of change between S and S' to determine the RL-1 reward signal R1, as described above, and also passes the degree of system changes between S and S' to RL-2.

In an embodiment, RL-2 uses the received degree of system state change to determine an RL-2 reward signal, R2. The method determines R2 as directly related to the degree of system change. Larger degrees of change yield a larger R2, smaller degrees of change yield a smaller R2 value. The method further considers the determined sleep time duration when determining R2. The method evaluates R2 as inversely proportional to the determined sleep time duration. Longer sleep time durations diminish R2, while sorter sleep time durations increase R2. As a result, RL-2 seeks a balance between short sleep time durations to quickly advance the evolution and training of RL-1, and long sleep time durations to maximize the time for action A to effect system performance.

In an embodiment, the method determines the degree of system state change for R2 using one or more statistical similarity tests on the two vectors. Along with comparing the whole vectors, the method uses determines which aspects of the system state have been affected the most by the action A taken by RL-1. As an example, the method divides each of S and S' into four corresponding vectors. For the example, the method divides S and S' into S1: Service Class 1 observation, S2: Service Class 2 observations, S3: Service-class3 observations, and S4: VMStats. The method divides S' in a similar manner. On comparing Si to corresponding Si', the method determines four additional quantities to provide better insights into the degree of change of state. The method determines a total difference D according to D=(W1*(1−ServiceClass1SimilarityScore)+W2*(1−ServiceClass2SimilarityScore))+W3**(1−ServiceClass2SimilarityScore)+((−1*sleeptime)/Max(sleeptimeaction)) where W1, W2, and W3 are defined weighting coefficients for each of the service classes. Weighting coefficients relate the resource usage of the class as a percentage of available resources. A "simple" service class may have a weighting coefficient of 30% while a "complex" service class may have a weighting percentage of 40%, etc., sleeptime refers to the RL-2 determined sleep time duration for the current S-S' system change, and Max(sleepttimeaction) refers to the maximum sleep time duration RL-2 has available as an action.

In an embodiment, fully trained RL-1 and RL-2 models have exploration values of zero, such that all RL-1 and RL-2 actions are exploitations of the trained tables or network weightings. In an embodiment, RL-1 receives system state data and determines, recommends, and implements, an action according to the table or network weightings. RL-2 receives the system state data and determines a sleep time for RL-1. RL-1 waits the determined sleep time and the process repeats until the exploration decay rate of the reinforcement learning falls to zero, indicating an exploitation rate of one for RL-1.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise reinforcement learning model program (not shown) together with sufficient computing resource (processor, memory, network communications hardware) to execute the program. Client devices 104 and 110 may provide system performance updates to the server subsystem 102, as part of utilizing RL agents to improve system performance. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning reward timing determination program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning reward timing determination program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
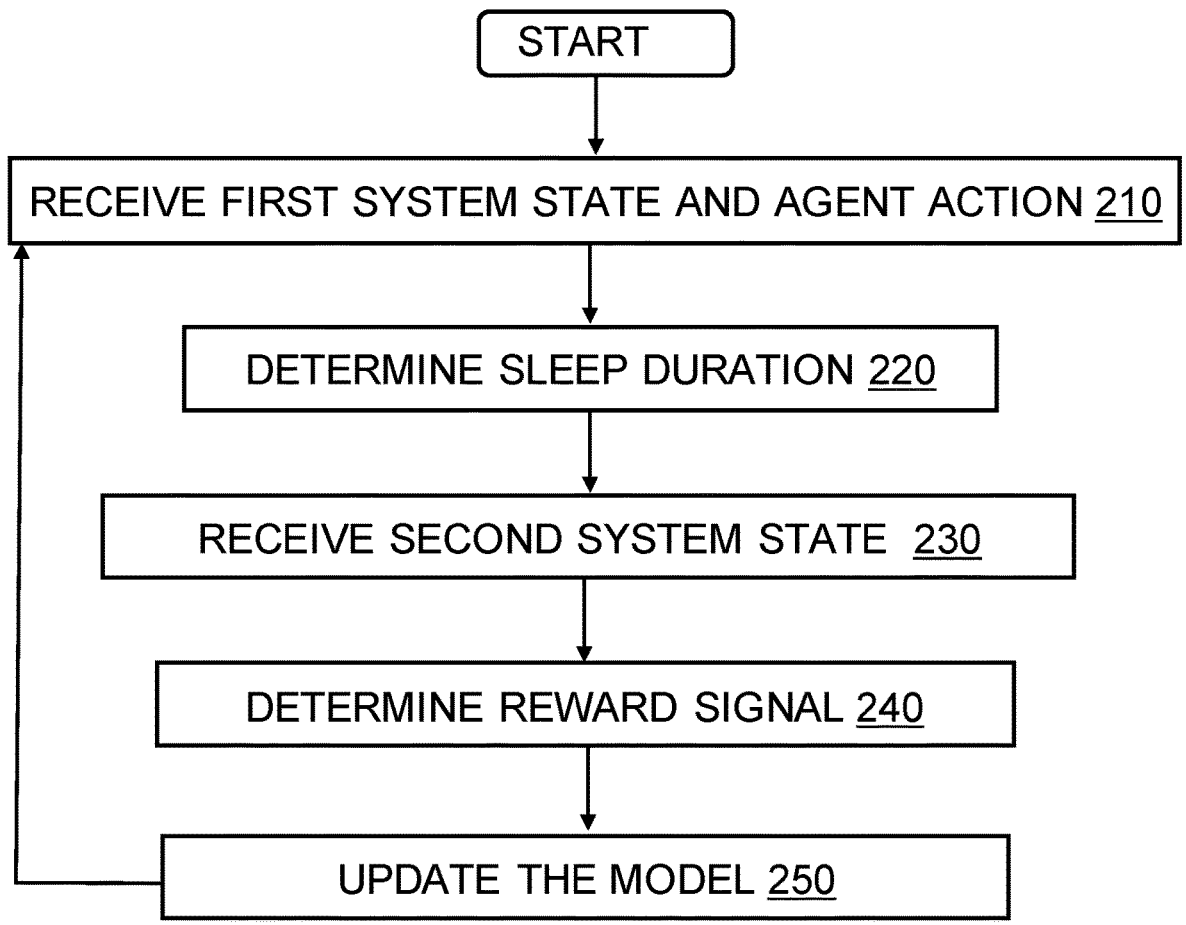
FIG. 2 provides a flowchart depicting an operational sequence, according to an embodiment of the invention.

FIG. 2 provides a flowchart 200, illustrating exemplary activities associated with the practice of the disclosure. Disclosed embodiments execute the respective steps illustrated in FIG. 2 utilizing a computing environment such as those depicted in FIGS. 1 and 3. After program start, at block 210, a first machine learning model, such as a reinforcement learning model, receives system state data, and an action determined by a second machine learning model according to the system state data. As an example, the first RL model, RL-1, receives system state data and determines an action A. The RL-1 passes the system state data and the action to a second RL model, RL-2. Alternatively, the second RL model receives the system state data and action data from an intermediary component, or the RL-2 receives the system state data independently from the RL-1.

At block 220, the first machine learning model determines a sleep time duration for the second machine learning model. The second machine learning model pauses for the determined sleep time duration and then resumes by determining the then-current system state. The second machine learning model then determines a reward signal R1, based upon the change in the system state. For the example, RL-2 receives the system state and action data from RL-1 and determines a sleep time duration T, and passes the determined time T, to RL-1. RL-1 waits time T and then determines the then –current systems state. RL-1 then determines the changes in the systems state and determines a reward signal according to the changes in the system state.

At block 230, the first machine learning model receives updated systems state data associated with the system state after the determines sleep time duration has passed. In an embodiment, the second machine learning model passes the second system state data to the first model. In an embodiment, the second machine learning model passes the changes in the system state to the first machine learning model. For the example, after sleep time duration T has passed, RL-1 receives, or otherwise determines, the system state and the differences between the new system state and the previous system state. RL-1 then determines a reward signal R1, according to the changes in the system state due to the action A. RL-1 then passes the new system state and/or the changes in the system state to RL-2.

At block 240, the first machine learning model determines a second reward signal according to the degree of changes between the original and new system states, as well as according to the length of the determined sleep time duration. The reward signal R2 depends directly upon the degree of system state change and depends inversely upon the length of the sleep time duration. For the example, RL-2 receives the changes in the system state from RL-1 and determines a reward signal R2, according to the length of the sleep time duration and the degree of change to the system state during the sleep duration time.

At block 250, training of the first machine learning model continues. The method updates model network weights, or [state, action] matrix entries using the degree of system change and the sleep duration time determined by the first machine learning model. For the example, the method updates RL-2 using T and the degree of change between the previous and new system states. The method also updates RL-1 using the previous state, the action, and the reward signal R1.

The disclosed RL spaces may include large numbers of state-action pairs such that local computing environments cannot provide timely analysis and interventions to improve system performance. Such environments may utilize edge cloud and cloud resources to enable timely RL agent activities to improve the performance of the target systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
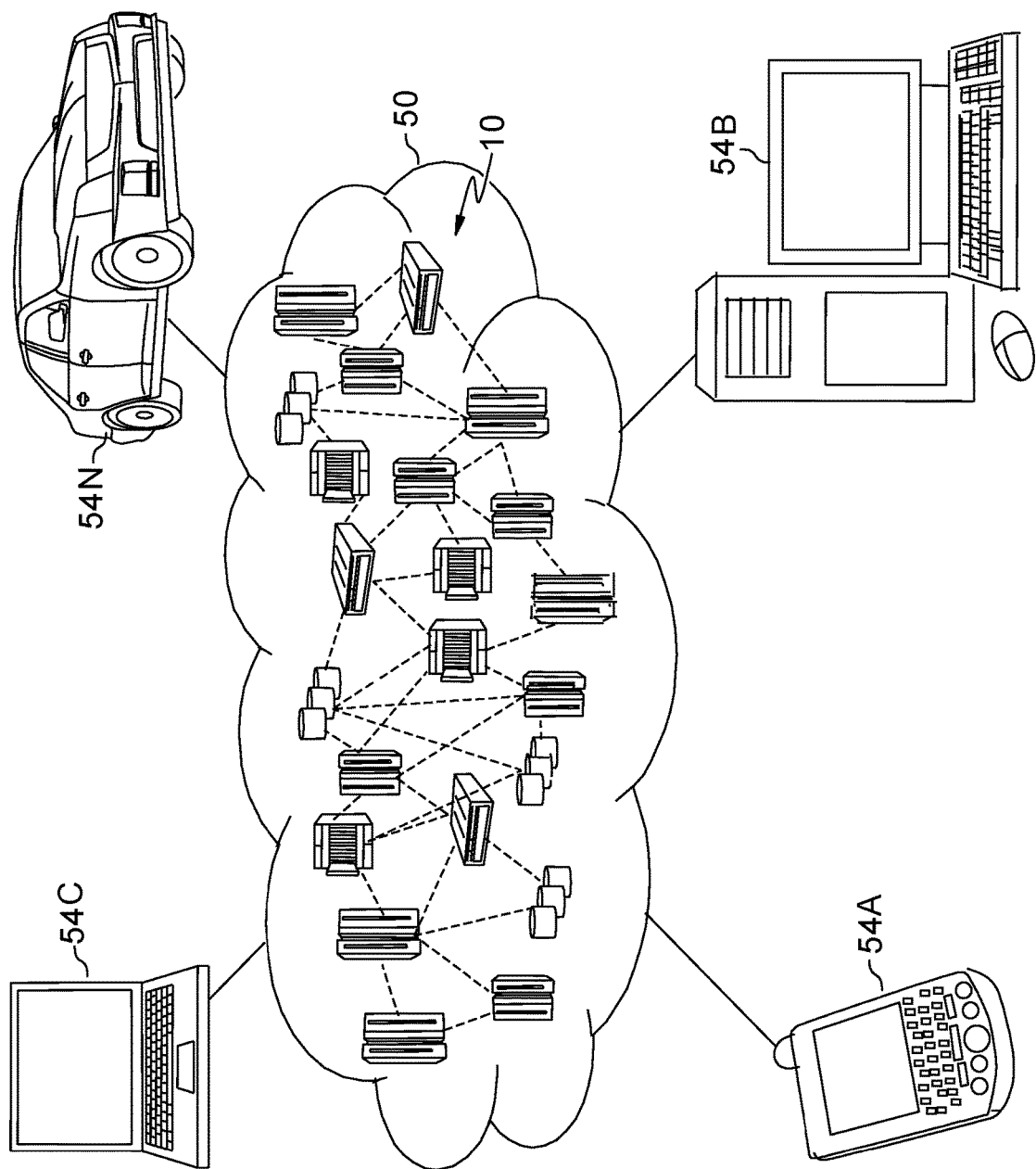
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
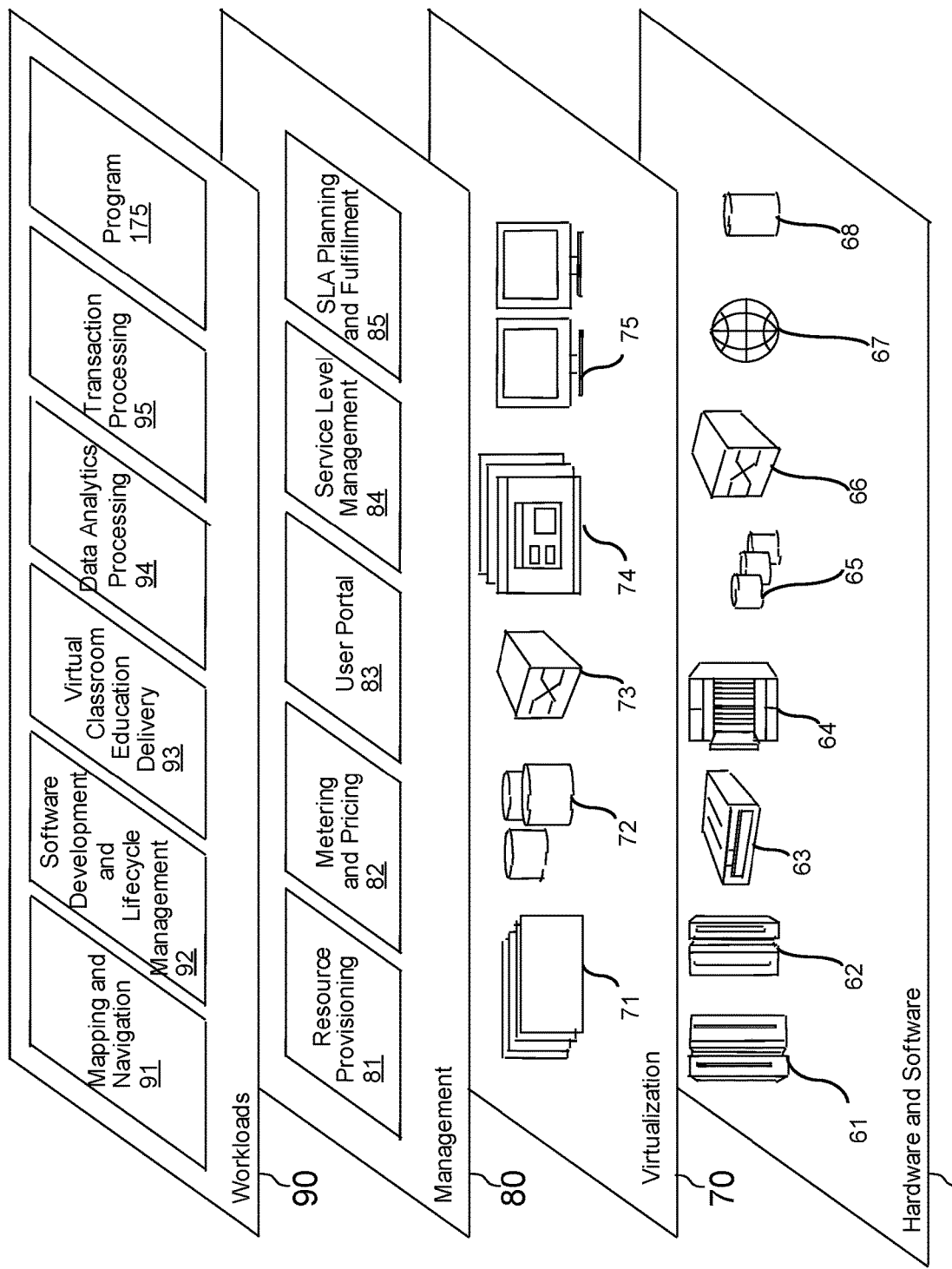
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning reward timing determination program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as SMALLTALK, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for dynamically determining timing for a machine learning model reward signal, the method including:
   receiving, by a first machine learning model, data associated with a first system state, and an action determined by a second machine learning model according to the first system state;
   determining, by the first machine learning model, a sleep time duration for the second machine learning model according to the first system state and the action;
   receiving, by the first machine learning model, after the sleep time duration, data associated with a second system state;
   determining, by the first machine learning model, a first reward signal according to a first difference between the first system state and the second system state, and the sleep time duration; and
   updating the first machine learning model according to the first reward signal, the difference between the first system state and the second system state, and the sleep time duration.

2. The computer implemented method according to claim 1, further comprising:
   determining a second reward signal according to a second difference between the first system state and the second system state.

3. The computer implemented method according to claim 2, wherein the second reward signal is directly proportional to increases in system throughput, and inversely proportional to increases in system wait time.

4. The computer implemented method according to claim 2, further comprising:
   updating the second machine learning model according to the second reward signal, a previous system state and an action taken according to the previous system state.

5. The computer implemented method according to claim 1, wherein the first machine learning model comprises a reinforcement learning model.

6. The computer implemented method according to claim 1, wherein the second machine learning model comprises a reinforcement learning model.

7. The computer implemented method according to claim 1, wherein the first reward signal is directly proportional to the first difference between the first system state and the second system state, and inversely proportional to the sleep time duration.

8. A computer program product for dynamically determining timing for a machine learning model reward signal, the computer program product comprising one or more computer readable storage devices and collectively stored program instructions on the one or more computer readable storage devices, the stored program instructions comprising:
   program instructions to receive, by a first machine learning model, data associated with a first system state, and an action determined by a second machine learning model according to the first system state;
   program instructions to select, by the first machine learning model, a sleep time duration for the second machine learning model according to the first system state and the action;
   program instructions to receive, by the first machine learning model, after the sleep time duration, data associated with a second system state;
   program instructions to determine, by the first machine learning model, a first reward signal according to a first difference between the first system state and the second system state, and the sleep time duration; and
   program instructions to update the first machine learning model according to the first reward signal, the difference between the first system state and the second system state, and the sleep time duration.

9. The computer program product according to claim 8, the stored program instructions further comprising program instructions to determine a second reward signal according to a second difference between the first system state and the second system state.

10. The computer program product according to claim 9, wherein the second reward signal is directly proportional to increases in system throughput, and inversely proportional to increases in system wait time.

11. The computer program product according to claim 9, the stored program instructions further comprising program instructions to update the second machine learning model according to the second reward signal, a previous system state and an action taken according to the previous system state.

12. The computer program product according to claim 8, wherein the first machine learning model comprises a reinforcement learning model.

13. The computer program product according to claim 8, wherein the second machine learning model comprises a reinforcement learning model.

14. The computer program product according to claim 8, wherein the first reward signal is directly proportional to the first difference between the first system state and the second system state, and inversely proportional to the sleep time duration.

15. A computer system for dynamically determining timing for a machine learning model reward signal, the computer system comprising:
one or more computer processors;
one or more computer readable storage devices; and
stored program instructions on the one or more computer readable storage devices for execution by the one or more computer processors, the stored program instructions comprising:
program instructions to receive, by a first machine learning model, data associated with a first system state, and an action determined by a second machine learning model according to the first system state;
program instructions to select, by the first machine learning model, a sleep time duration for the second machine learning model according to the first system state and the action;
program instructions to receive, by the first machine learning model, after the sleep time duration, data associated with a second system state;
program instructions to determine, by the first machine learning model, a first reward signal according to a first difference between the first system state and the second system state, and the sleep time duration; and
program instructions to update the first machine learning model according to the first reward signal, the difference between the first system state and the second system state, and the sleep time duration.

16. The computer system according to claim 15, the stored program instructions further comprising program instructions to determine a second reward signal according to a second difference between the first system state and the second system state.

17. The computer system according to claim 16, wherein the second reward signal is directly proportional to increases in system throughput, and inversely proportional to increases in system wait time.

18. The computer system according to claim 16, the stored program instructions further comprising program instructions to update the second machine learning model according to the second reward signal, a previous system state and an action taken according to the previous system state.

19. The computer system according to claim 15, wherein the first machine learning model comprises a reinforcement learning model.

20. The computer system according to claim 15, wherein the first reward signal is directly proportional to the first difference between the first system state and the second system state, and inversely proportional to the sleep time duration.

* * * * *